(12) United States Patent
Fujiwara

(10) Patent No.: US 8,907,955 B2
(45) Date of Patent: Dec. 9, 2014

(54) VECTOR IMAGE DRAWING DEVICE, VECTOR IMAGE DRAWING METHOD, AND RECORDING MEDIUM

(75) Inventor: Hiroshi Fujiwara, Osaka (JP)

(73) Assignees: NEC Soft, Ltd., Tokyo (JP); NEC Solution Innovators, Ltd., Tokyo (JP)

( * ) Notice: Subject to any disclaimer, the term of this patent is extended or adjusted under 35 U.S.C. 154(b) by 788 days.

(21) Appl. No.: 13/125,836

(22) PCT Filed: Nov. 9, 2009

(86) PCT No.: PCT/JP2009/069047
§ 371 (c)(1),
(2), (4) Date: Apr. 25, 2011

(87) PCT Pub. No.: WO2010/053175
PCT Pub. Date: May 14, 2010

(65) Prior Publication Data
US 2011/0205232 A1    Aug. 25, 2011

(30) Foreign Application Priority Data

Nov. 7, 2008    (JP) .................. 2008-287185

(51) Int. Cl.
| | | |
|---|---|---|
| G09G 5/00 | (2006.01) |
| G09G 5/36 | (2006.01) |
| G06T 11/20 | (2006.01) |
| G06F 15/00 | (2006.01) |
| G06K 1/00 | (2006.01) |
| G06K 15/00 | (2006.01) |
| H04N 1/40 | (2006.01) |
| H04N 1/405 | (2006.01) |
| G06T 11/40 | (2006.01) |

(52) U.S. Cl.
CPC ..................... G06T 11/40 (2013.01)
USPC ........... 345/441; 345/611; 345/612; 345/616; 345/442; 345/443; 345/560; 358/1.9; 358/3.01; 358/3.03; 358/3.05; 358/3.06; 358/3.13; 358/3.14; 358/3.15

(58) Field of Classification Search
CPC .... G06K 15/02; G09G 3/2059; G06T 11/203; G06T 15/503; G06T 11/40; G06T 11/001; H04N 1/405; H04N 1/4051; H04N 1/4052; H04N 1/4053; H04N 1/4055; H04N 1/4092
USPC ............... 345/611, 612, 616, 441–443, 560; 358/1.9, 3.01, 3.03, 3.05, 3.06, 358/3.13–3.15
See application file for complete search history.

(56) References Cited

U.S. PATENT DOCUMENTS

| | | | | |
|---|---|---|---|---|
| 5,355,451 | A | * | 10/1994 | Nonaka .................. 345/530 |
| 2009/0257092 | A1 | * | 10/2009 | Mantell et al. ............ 358/3.03 |

FOREIGN PATENT DOCUMENTS

| | | |
|---|---|---|
| JP | 7-231444 A | 8/1995 |
| JP | 7-325928 A | 12/1995 |
| JP | 9-284557 A | 10/1997 |

OTHER PUBLICATIONS

International Search Report for PCT/JP2009/069047 mailed Dec. 15, 2009.

*Primary Examiner* — Ke Xiao
*Assistant Examiner* — Jed-Justin Imperial
(74) *Attorney, Agent, or Firm* — Sughrue Mion, PLLC

(57) ABSTRACT

A vector image drawing device has the following configuration. A contour generation unit (104), based on vector data, generates contour data that represents the starting pixels on a scan line in a drawing area where fill-in starts, and the ending pixels where fill-in ends. An outline buffer (106) stores the number of starting or ending pixels in the contour data for fill-in for each drawn pixel. An error judgment unit (2), when storing the contour data in the outline buffer (106), determines in which pixel there is overflow in the outline buffer of contour data. A pixel position transfer unit (3) adds the numerical value of the overflow portion of a pixel that the error judgment unit (2) determined to have overflow to the numerical value of contour data that corresponds to a pixel.

5 Claims, 10 Drawing Sheets

FIG. 4

| SHAPE | CONTOUR DATA | | |
|---|---|---|---|
| | SCAN LINE | STARTING POINT | ENDING POINT |
| SHAPE A | ⋮ | ⋮ | ⋮ |
| | 100 | PIXEL 2 | PIXEL 14 |
| | ⋮ | ⋮ | ⋮ |
| SHAPE B | ⋮ | ⋮ | ⋮ |
| | 100 | PIXEL 14 | PIXEL 22 |
| | ⋮ | ⋮ | ⋮ |
| SHAPE C | ⋮ | ⋮ | ⋮ |
| | 100 | PIXEL 14 | PIXEL 30 |
| | ⋮ | ⋮ | ⋮ |

FIG. 5

SCAN LINE 100

| PIXEL | CONTOUR DATA | | OUTLINE DATA |
|---|---|---|---|
| | NUMBER OF STARTING POINTS | NUMBER OF ENDING POINTS | |
| ⋮ | ⋮ | ⋮ | ⋮ |
| PIXEL 2 | 1 | 0 | 1 |
| ⋮ | ⋮ | ⋮ | ⋮ |
| PIXEL 6 | 0 | 0 | 0 |
| ⋮ | ⋮ | ⋮ | ⋮ |
| PIXEL 14 | 2 | 1 | 1 |
| ⋮ | ⋮ | ⋮ | ⋮ |
| PIXEL 22 | 0 | 1 | -1 |
| ⋮ | ⋮ | ⋮ | ⋮ |
| PIXEL 30 | 0 | 1 | -1 |
| ⋮ | ⋮ | ⋮ | ⋮ |

VECTOR IMAGE DRAWING DEVICE, VECTOR IMAGE DRAWING METHOD, AND RECORDING MEDIUM

This application is the National Phase of PCT/JP2009/069047, filed Nov. 9, 2009, which is based on Japanese Patent Application No. 2008-287185, filed on Nov. 7, 2008. The specification, claims and drawings of Japanese Patent Application No. 2008-287185 are incorporated by reference in this specification.

TECHNICAL FIELD

The present invention relates to a vector image drawing device, vector image drawing method and a recording medium for displaying an image from vector data.

BACKGROUND ART

Of the image data that are displayed by a general-purpose display device, there are raster images that are represented by a 2-dimensional array of pixels, and vector images that have information of line. Vector images are represented, for, example, by starting points and ending points of line segments, a combination of the degree of functions and points that define a curved line, or data that specifies an arc, etc.

A raster image maintains the color and brightness for each pixel as data, so that there is no need to calculate them when displaying an image; however, when enlarging the display of the image, the image is enlarged in the unit of pixel, so that roughness of the image stands out. On the other hand, vector image data (vector data) is expanded in a 2-dimensional pixel array in accordance with the resolution of the display, so that when enlarging or reducing an image, it is possible to display the image at that resolution. For example, there is an outline font that maintains the character type face (called a font) in the form of vector data, so that a smooth display can be obtained.

A raster image maintains the color and brightness of all pixels as data, so even when filling in a figure, it can be displayed as is. On the other hand, for a vector image, an area that is filled with color is represented by a closed shape, and only the fill-in color and brightness are specified by data, so that when displaying a filled in area, it is necessary to set the pixels that are included in that area, and to set the pixels in that area to the specified color and brightness. When there are overlapping shapes, the points of intersection and overlapping areas are calculated from the vector data, and the fill-in pixels are set.

In a vector image drawing device that generates contours, an outline buffer is used for storing contour information; however, when it is desired to reduced the capacity of the outline buffer, this is often accomplished by reducing the number of bits in the unit of pixel. Technology for improving improper color values of an image when encoding and decoding image data is disclosed in Patent Literature 1. In the encoding and decoding device disclosed in Patent Literature 1, an encoding unit extracts the difference between an original image and average image, and creates difference data, then performs vector quantization of the difference data to create vector quantization code. Then, the encoding device attempts decoding from the vector quantization code and average image to the original image, and checks whether overflow occurs, and depending on the result, creates exception judgment information. A decoding unit creates difference data from the vector quantization code, and together with decoding the image by adding the difference data and average image, performs exception processing according to the exception judgment information that was created by the encoding processing device when decoding the image.

Patent Literature 2, which is related to technology for improving improper color values in an image, discloses a method of preventing white out in an image due to CCD overflow that occurs because of reflected light in a copier. The technology in Patent Literature 2 set in advance the white level and black level when a CCD read a document, and of the output from a 10-bit A/D converter that digitizes the CCD output, up to the set value of the white level is handled as an 8-bit video signal, and the upper two bits are an overflow detection signal. When overflow is detected, the data of that object pixel is corrected by an image correction circuit using surrounding image data.

RELATED ART LITERATURE

Patent Literature

Patent literature 1: Unexamined Japanese Patent Application KOKAI Publication No. H07-231444
Patent literature 2: Unexamined Japanese Patent Application KOKAI Publication No. H09-284557

DISCLOSURE OF INVENTION

Problems the Invention is to Solve

In a vector image drawing device, when an outline buffer is used for storing contour data when generating a contour, the number of bits per pixel may be reduced in order to reduce the capacity of the outline buffer. By reducing the number of bits per pixel, the capacity of the outline buffer is reduced; however, overflow may occur in data of each pixel due to overlapping graphics. As a result of overflow of the outline buffer occurring, erroneous drawing is performed in the horizontal direction up to the pixel on the right end, which has a large effect on the drawing quality.

In other words, by reducing the number of bits in the unit of pixel, the amount of contour information that can be handled in the unit of pixel is reduced, and when writing of contour information occurs multiple times for the same pixel, non-aligned contour information occurs and there is a problem in that a large error in drawing occurs.

Taking the above problems into consideration, the object of the present invention is to provide a system that prevents contour information inconsistencies when drawing a vector image and improves the drawing quality.

Means for Solving the Problems

A vector image drawing device of a first aspect of the present invention comprises:
a contour generation unit that, based on vector data, generates contour data that represents starting pixels on a scan line in a drawing area where fill-in starts, and ending pixels where fill-in ends;
an outline buffer that stores the number of starting or ending fill-in points of the contour data for each drawn pixel;
a judgment unit that, when storing the contour data in the outline buffer, determines in which pixel there is overflow in the outline buffer of contour data; and
a setting unit that adds the numerical value of the overflow portion of a pixel that the judgment unit determined to have overflow to the numerical value of contour data that corresponds to a pixel adjacent to the pixel in which overflow occurred.

A vector image drawing method of a second aspect of the present invention comprises:

a contour generation step of, based on vector data, generating contour data that represents starting pixels on a scan line in a drawing area where fill-in starts, and ending pixels where fill-in ends;

a storage step of storing the number of starting or ending fill-in points of the contour data for each drawn pixel in an outline buffer;

a judgment step of, when storing the contour data in the outline buffer, determining in which pixel there is overflow in the outline buffer of contour data; and a setting step of adding the numerical value of the overflow portion of a pixel that the judgment step determined to have overflow to the numerical value of contour data that corresponds to a pixel adjacent to the pixel in which overflow occurred.

A recording medium of a third aspect of the present invention that stores a program that causes a computer to execute:

a contour generation step of, based on vector data, generating contour data that represents starting pixels on a scan line in a drawing area where fill-in starts, and ending pixels where fill-in ends;

a storage step of storing the number of starting or ending fill-in points of the contour data for each drawn pixel in an outline buffer;

a judgment step of, when storing the contour data in the outline buffer, determining in which pixel there is overflow in the outline buffer of contour data of a pixel; and a setting step of adding the numerical value of the overflow portion of a pixel that the judgment step determined to have overflow to the numerical value of contour data that corresponds to a pixel adjacent to the pixel in which overflow occurred.

Advantages of the Invention

With the present invention it is possible to prevent drawing errors from occurring when drawing vector images, even when overflow occurs in an outline buffer.

BRIEF DESCRIPTION OF DRAWINGS

FIG. 4 is a diagram illustrating an example of contour data in the case when the image in FIG. 3 is drawn.

FIG. 5 is a diagram illustrating an example of data that is stored in an outline buffer when the image in FIG. 3 is drawn.

BEST MODE FOR CARRYING OUT THE INVENTION

Figure 1:
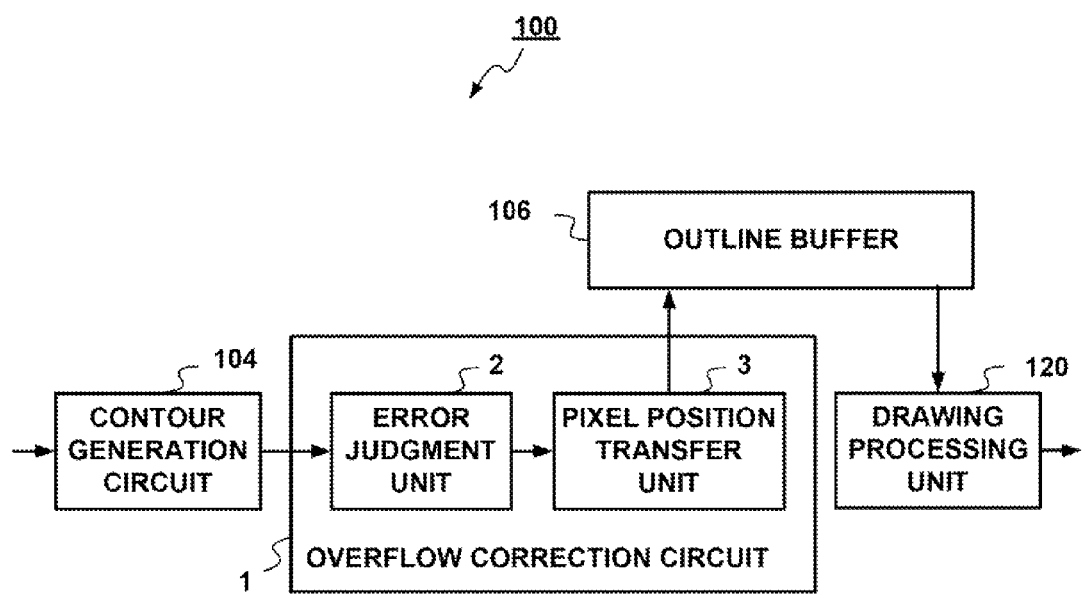
FIG. 1 is a block diagram illustrating an example of construction of an overflow correction circuit of an embodiment of the present invention.

FIG. 1 is a block diagram illustrating the construction of an overflow correction circuit of an embodiment of the present invention. FIG. 1 illustrates a part of a drawing device 100. The drawing device 100 comprises a contour generation circuit 104, an overflow correction circuit 1, an outline buffer 106, and a drawing processing unit 120. The overflow correction circuit 1 comprises an error judgment unit 2, and a pixel position transfer unit 3.

When storing contour data that indicates the starting or ending pixels for fill-in along a scan line in an outline buffer 106, and overflow occurs in information related to the contour data (hereafter, referred to as "outline data") that is stored in the outline buffer, the overflow correction circuit 1 corrects that overflow.

Figure 2:
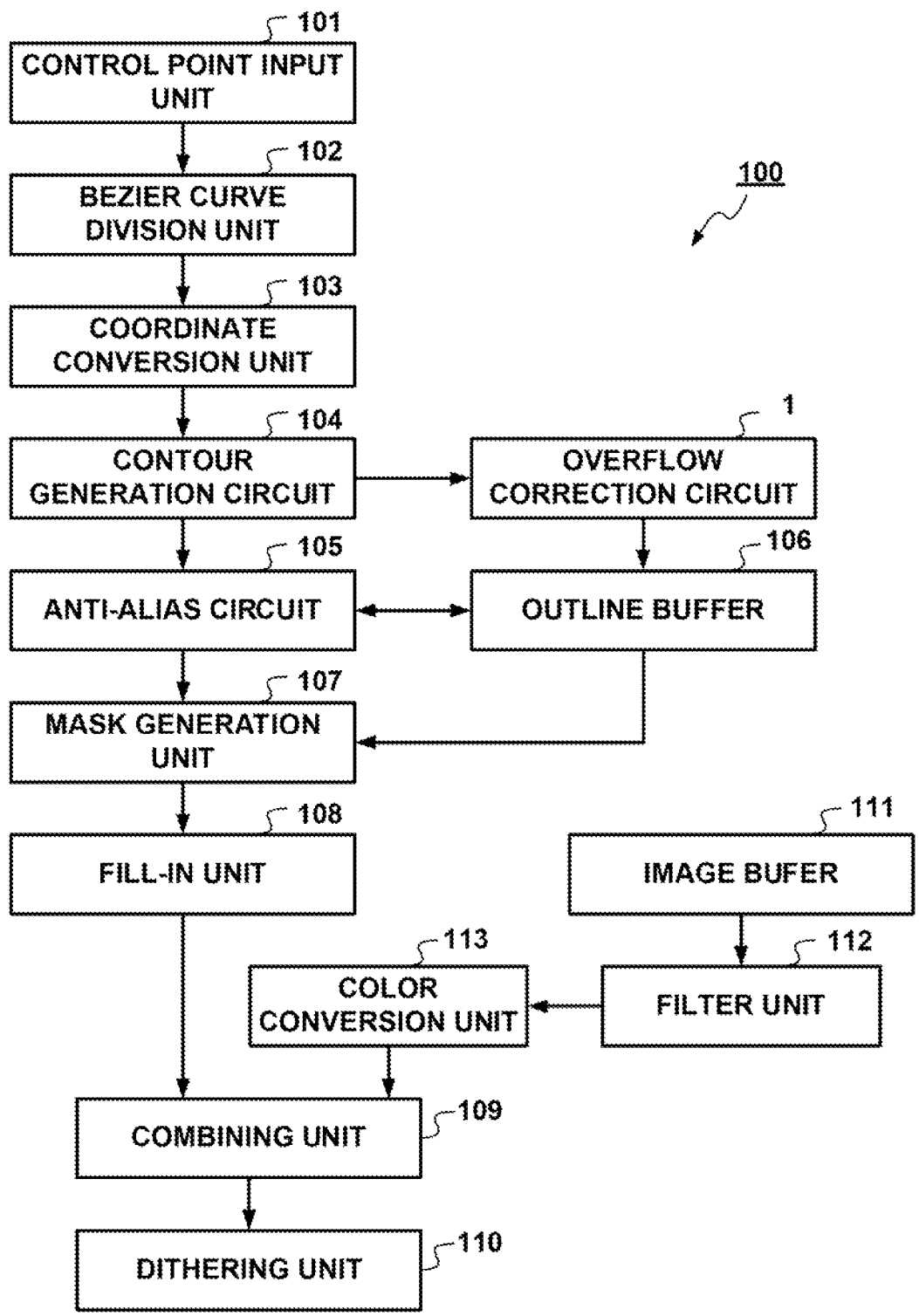
FIG. 2 is a block diagram illustrating an example of construction of a drawing device.

FIG. 2 is a block diagram illustrating an example of the construction of a drawing device 100 that includes the overflow correction circuit 1. The drawing device 100 comprises a control point input unit 101, a Bezier curve division unit 102, a coordinate conversion unit 103, a contour generation circuit 104, an anti-alias circuit 105, an overflow correction circuit 1, an outline buffer 106, a mask generation unit 107, a fill-in unit 108, a combining unit 109, a dithering unit 110, an image buffer 111, a filter unit 112, and a color conversion unit 113.

A summary of the processing by the drawing device 100 is explained. The control point input unit 101 acquires the coordinates of control points of a Bezier curve, and the Bezier curve division unit 102 outputs coordinates of division points for approximating the Bezier curve with line segments, after which the coordinate conversion unit 103 converts the coordinates of the division points to coordinates inside the entire display screen. The contour generation circuit 104 stores, as outline data, information related to contour data indicating pixels through which each of the line segments from the coordinates of the division points pass in the outline buffer 106. When setting outline data and overflow occurs in the outline data, the overflow correction circuit 1 corrects that overflow. The anti-alias circuit 105 performs anti-aliasing processing from the information about each line segment of the contour line, and calculates the fill-in rate of contour line pixels. The mask generation unit 107 generates mask data from outline data. The fill-in unit 108 performs the fill-in processing according to the mask data.

On the other hand, when overlapping image data with image data such as bitmap data that is represented by color and brightness data for each pixel, the image data is stored in the image buffer 111. The filter unit 112 performs processing such as edge enhancement and singularity removal on the stored image data, and the color conversion unit 113 converts the color of the image data so that it corresponds to the display device. The combining unit 109 combines the image data with the image generated from the outline data, and finally, the dithering unit 110 applies the dithering effect on the image data having been combined, so that the image is easy to view in the screen, and generates drawing data.

The drawing processing unit 120 in FIG. 1 corresponds to the mask generation unit 107 in FIG. 2 and later. In FIG. 1, from the control input unit 101, which is the portion just before contour generation, to the coordinate conversion unit 103, and the anti-alias circuit 105 are omitted.

The processing procedure of the present invention for generating contour data is explained using FIG. 1. The overflow correction circuit 1 of this embodiment additionally has an error judgment unit 2 and pixel position transfer unit 3 in the path to storing generated contour data in the outline buffer 106.

The error judgment unit 2 checks the state of the contour data of a pixel that the contour generation circuit 104 is going to store, and determines whether overflow has occurred in that pixel. When the error judgment unit 2 determines that overflow has occurred, the error judgment unit 2 notifies the pixel position transfer unit 3 of the error information. The pixel position transfer unit 3 receives the error information that was notified by the error judgment unit 2. When overflow has occurred, the pixel position transfer unit 3 adds the overflow portion to the outline data of a pixel adjacent to the pixel in which overflow occurred, and rewrites the data in the outline buffer 106. When overflow occurs in the adjacent pixel to which the overflow portion was added, the pixel position transfer unit 3 also adds the overflow portion to the closest pixel on the same scanning line in which outline data is set and for which overflow has not occurred, and rewrites the data in the outline buffer 106.

The drawing processing unit 120 determines whether or not to perform drawing of each of the pixels from the outline data that was read from the outline buffer 106. More specifically, when the pixel value is "0" as a result of adding outline data in the scan line direction, the drawing processing unit 120 does not draw, and for other values, the drawing processing unit 120 draws to that pixel. Judgment is performed from the pixel on the left end. The pixel on the left end uses the outline data that is read from the outline buffer 106 as is. For pixels after that, the drawing processing unit 120 determines whether or not the result of adding outline data of a pixel to the data of the pixel processed immediately before is "0".

In the following, the contour data of this embodiment and outline data (data stored in the outline buffer) will be explained using the shapes in FIG. 3 (shape A, shape B and shape C) as an example.

Figure 3:
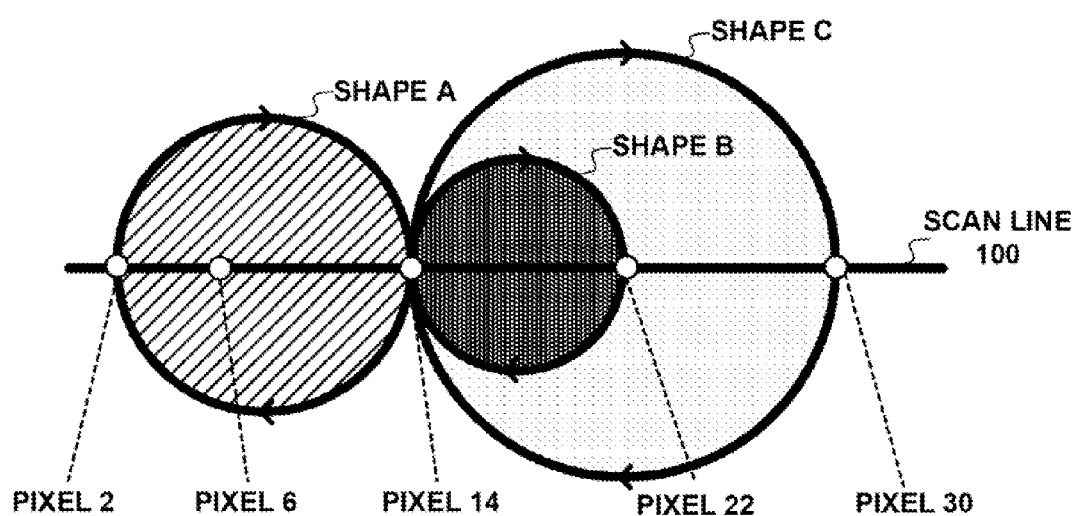
FIG. 3 is a drawing illustrating an example of an image drawn on a screen.

The screen on which the shapes in FIG. 3 are drawn has a plurality of scan lines i (i=0 to I (I is arbitrary)), and a plurality of pixels n (n=0 to N (N is arbitrary)) are arranged on one scan line. The contour data of a shape is made up of a shape fill-in starting point and ending point (hereafter, referred to as simply "starting point" and "ending point") along each of the scan lines, so that, for example, the contour data of each shape in FIG. 3 is stored as illustrated in FIG. 4. That is, on scan line 100 in FIG. 3, the starting point of shape A passes through pixel 2 and the ending point passes through pixel 14, the starting point of shape B passes through pixel 14 and the ending point passes through pixel 22, and the starting point of shape C passes through pixel 14 and the ending point passes through pixel 30, so that the starting points and ending points of the shapes are stored as contour data.

Next, the outline data that is set for each pixel is generated as described below. When the contour of a shape crosses the scan line from bottom to top, 1 is added to the outline data, and when the contour crosses in the opposite direction from top to bottom, 1 is subtracted from the outline data. In this case, when each shape is drawn in the direction illustrated by the arrows in FIG. 3, the number of starting points is the number of times the scan line is crossed from bottom to top, and the number of ending points is the number of times the scan line is crossed from top to bottom. Therefore, the outline data can be found by the equation "number of starting points×1+number of ending points×(−1)". In the case of the shapes in FIG. 3, for example, pixel 6 has neither a starting point nor ending point, so that the outline data is found to be 0, and pixel 14 has two starting points and one ending point (see FIG. 4), so that the outline data is found to be 1 (FIG. 5).

The operation of the overflow correction circuit 1 of this embodiment is explained below using an example. In the example below, the case of an outline buffer 106, in which the data for each pixel is 4-bit data that, can be expressed as a value between −8 to 7, is explained.

Figure 6:
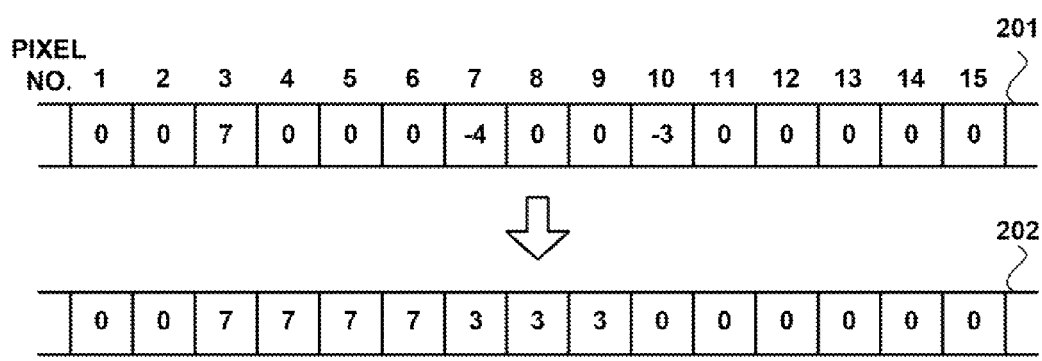
FIG. 6 is a diagram illustrating an example of data that is stored in an outline buffer when overflow does not occur.

FIG. 6 illustrates an example of outline data that is stored in the outline buffer 106 in a case where overflow does not occur. The outline data 201 in FIG. 6 is an example of outline data of one line in the scan line direction that is stored in the outline buffer 106. In the example in FIG. 6, the value at the third pixel from the left indicates that the scan line has been crossed 7 times from the bottom to the top, and the value at the seventh pixel from the left indicates that the scan line has been crossed 4 times from the top to the bottom, and the value at the tenth pixel from the left indicates that the scan line has been crossed 3 times from the top to the bottom.

The drawing processing unit 120 reads the outline data that is stored in the outline buffer 106 starting from the pixel on the left end, and performs processing of adding the data of each pixel along the scan line direction. The bottom of FIG. 6 illustrates an example of added pixel data 202.

In the example in FIG. 6, up to the second pixel from the left, each of the outline data is 0, so after addition is still 0. The outline data for the third pixel is 7, so that after adding the outline data becomes 7. From the fourth pixel to the sixth pixel from the left, each of the outline data is 0, so that the 7 of the third pixel is added to the outline data of each of these pixels and becomes 7. The outline data of the seventh pixel from the left is −4, so that when added to the previous value of 7, the resulting outline data becomes 3. Each of the outline data for the eighth pixel and ninth pixel from the left is 0, so after adding, becomes 3. The outline data of the tenth pixel from the left is −3, so when added to the immediately previous value of 3, the resulting outline data becomes 0, each of the outline data of the pixels from the eleventh pixel from the left to the right end is 0, so after adding is 0. The result after this process is illustrated as pixel data 202 in FIG. 6. When using a rule of drawing pixels other than pixels whose outline data is 0, it is determined that the pixels from the third pixel to the ninth pixel from the left are the object of drawing.

Figure 7:
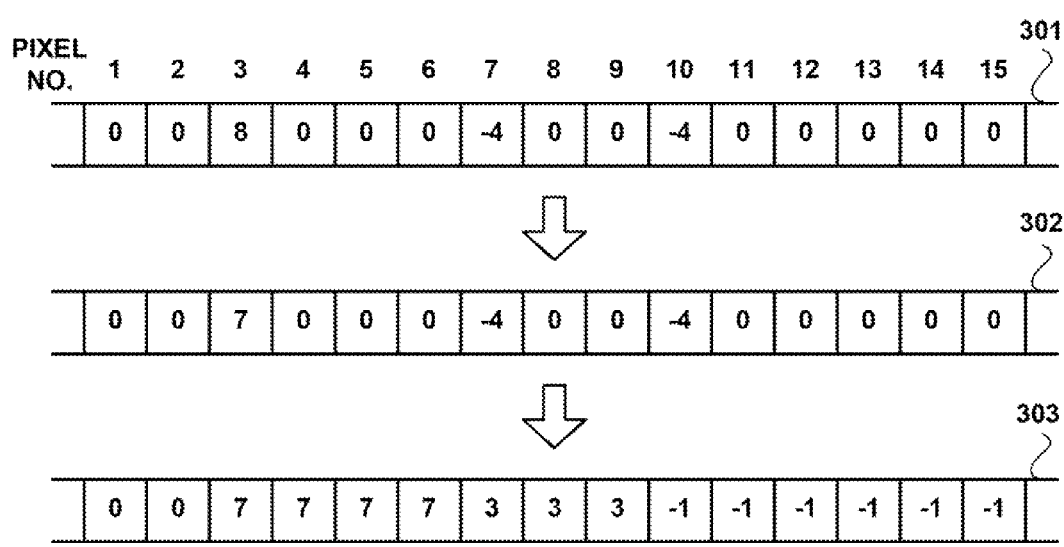
FIG. 7 is a diagram illustrating an example of data that is stored in an outline buffer when overflow occurs.

FIG. 7 illustrates an example when overflow occurred in a vector image drawing process that does not perform overflow correction. The outline data 301 at the top of FIG. 7 is information that is originally to be stored in the outline buffer 106. In the example of the vector image in FIG. 7, outline data is generated such that the third pixel from the left is crossed 8 times from the bottom to the top, the seventh pixel from the left is crossed four times from the top to the bottom, and the tenth pixel is crossed 4 times from the top to the bottom.

In the example of this explanation, the each pixel of the outline buffer 106 can only store numerical values from −8 to 7, so overflow occurs at the third pixel from the left. The outline data 302 for the state of the outline buffer illustrated in the center of FIG. 7 is outline data that is actually set when the outline data illustrated by the outline data 301 at the top of FIG. 7 is generated. At the third pixel from the left where overflow occurred, when storing outline data to the outline buffer 106, the maximum value that can be stored is clamped at 7. The third pixel from the left tries to store 8, however because overflow occurred, as a result of the maximum value that can stored being clamped, the value becomes 7.

Using the outline data 302 of the state of the outline buffer, the data after the judgment process is performed by the drawing processing unit 120 is the pixel data 303 in FIG. 7. Each of the outline data for the pixels up to the second pixel from the left end is 0, so that after adding remains 0. The outline data of the third pixel from the left is 7, so after adding becomes 7. Each of the outline data of the fourth pixel to the sixth pixel from the left is 0, so after adding becomes 7. The outline data of the seventh pixel from the left is −4, so after adding becomes 3. Each of the outline data of the eighth pixel to the ninth pixel from the left is 0, so after adding remains 3. The outline data of the tenth pixel from the left is −4, so after adding becomes −1. Each of the outline data of the eleventh pixel from the left to the pixel on the right end is 0, so after adding remains −1.

The pixels drawn according to the information of the pixel data 303 in FIG. 7 are the pixels from the third pixel from the left to the pixel on the right end, so that when compared with the pixels from the third pixel to the ninth pixel from the left that were originally to be drawn, pixels from the tenth pixel to the pixel on the right end are drawn, and drawing error occurs.

Figure 8:
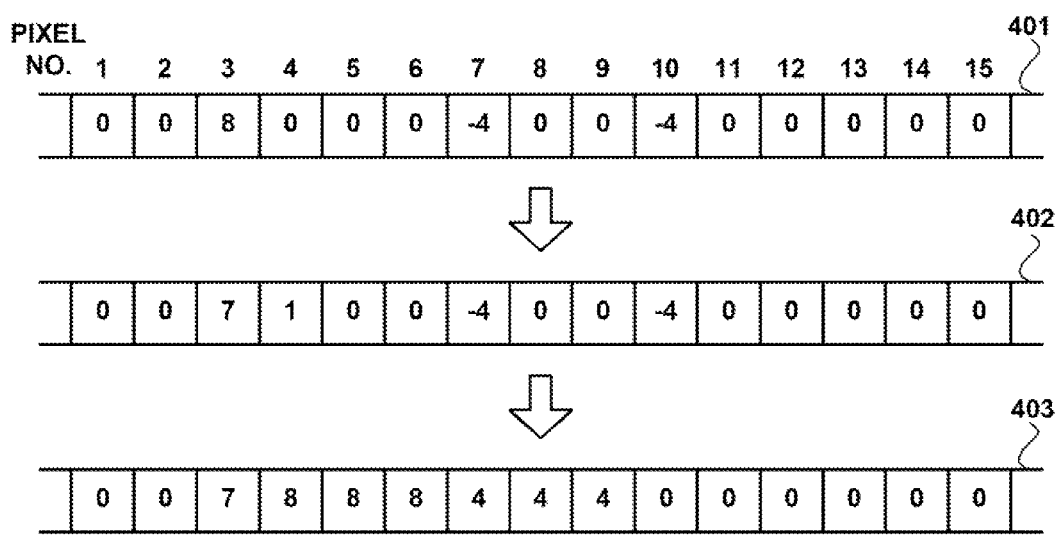
FIG. 8 is a diagram that explains the operation of the vector image drawing process of an embodiment.

FIG. 8 illustrates an example of processing using the drawing device 100 of this embodiment. The example in FIG. 8 is for a case in which original outline data is the same as that of FIG. 7, where the third pixel is crossed eight times from bottom to top, the seventh pixel from the left is crossed four times from top to bottom and the tenth pixel from the left is crossed from the top to bottom. The outline data 401 in FIG. 8 is information that is originally to be stored in the outline buffer 106. In the example of this explanation, the outline buffer 106 can only store values from −8 to 7, so the maximum value that the third pixel from the left can store is 7, so that the overflow portion is added to the adjacent fourth pixel from the left, and stores 1. The outline data 402 of the outline buffer of the state shown in FIG. 8 illustrates data of the outline buffer 106 after the drawing device 100 of this embodiment has performed overflow correction.

The data after processing has been performed by the drawing processing unit using the information of the outline data 402 of this state of the outline buffer is the pixel data 403 in FIG. 8. Up to the second pixel from the left end, each of the outline data is 0, so that after adding remains 0. The outline data at the third pixel from the left is 7, so that after adding becomes 7. The outline data at the fourth pixel from the left is 1, so after adding becomes 8. Each of the outline data at the fifth pixel to the sixth pixel from the left is 0, so after adding remains 8. The outline data at the seventh pixel from the left is −4, so after adding becomes 4. Each of the outline data from the eighth pixel to the ninth pixel from the left is 0, so after adding remains 4. The outline data at the tenth pixel from the left is −4, so after adding becomes 0. Each of the outline data from the eleventh pixel from the left to the pixel on the right end is 0, so after adding becomes 0.

The pixels drawn according to the information of the pixel data 403 in FIG. 8 are the pixels from the third pixel to the ninth pixel, so that drawing error does not occur.

Figure 9:
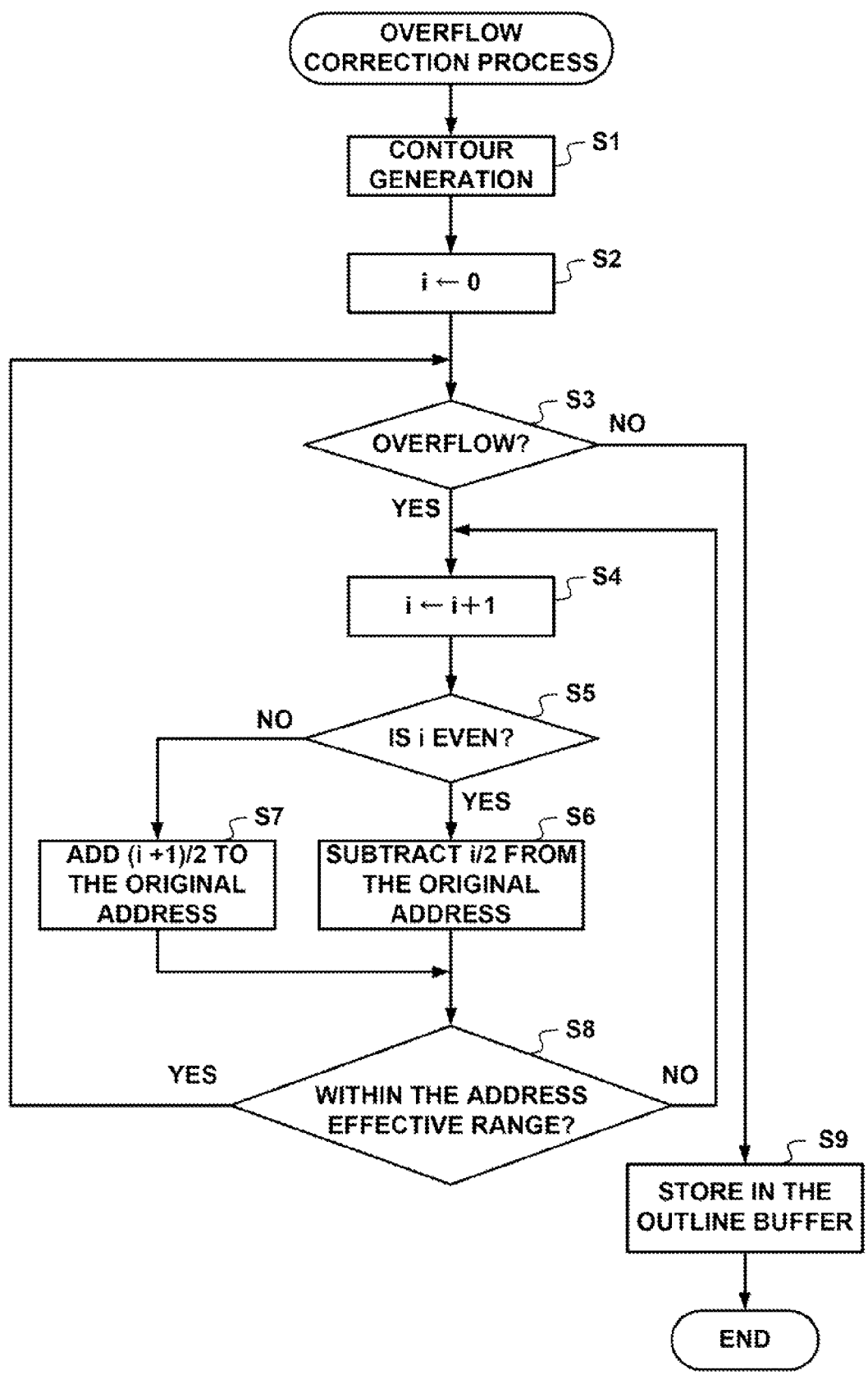
FIG. 9 is a flowchart illustrating an example of the operation of the overflow correction process of an embodiment.

FIG. 9 is a flowchart illustrating the operation of the overflow correction process of this embodiment. The overflow correction process is activated each time when a contour line is generated, and outline data is set in the outline buffer 106 for one scan line.

The contour generation circuit 104 generates contour data for a pixel (step S1), and the pixel position transfer unit 3 of the overflow correction circuit 1 sets the counter i to 0 (step S2). The error judgment unit 2 determines whether or not there is overflow of a value in the outline buffer 106 of a pixel for which outline data is set (step S3). When there is overflow (step S3: YES), the error judgment unit 2 adds 1 to the counter i (step S4).

When the counter i is an even number (step S5: YES), i/2 is subtracted from the address of the original outline buffer 106 the sets outline data, and the resulting address is taken to be the address for the next judgment (step S6). When the counter i is an odd number (step S5: NO), (i+1)/2 is added to the address of the original outline buffer 106 the sets outline data, and the resulting address is taken to be the address for the next judgment (step S7). That is, when there is overflow in the outline buffer 106 being checked, and the next judgment (counter i) is an even numbered time, the outline buffer 106 of the pixel before the first pixel along the scan line is selected, and when the next judgment (counter i) is an odd numbered time, the outline buffer 106 of the pixel after the first pixel is selected.

When the address of the next judgment is within an effective range, that is, within the outline buffer 106 of that scan line (step S8: YES), processing returns to step S3, and when outline data is added to the value of the outline buffer 106 of that address, the error judgment unit 2 determines whether or not there was overflow (step S3). When the address of the next judgment is not within the effective range (step S8: NO), judgment is not performed for that address, after which processing returns to step S4 and the counter i is incremented.

In the judgment of step S3, when there is no overflow (step S3: NO), the pixel position transfer unit 3 adds outline data to the outline buffer 106 of the judged address and stores the result (step S9). Therefore, the overflow value is added and set in the outline buffer 106 that has no overflow and that is closest to the outline buffer 106 of the pixel for with outline data was generated.

When there is overflow, instead of the outline buffer 106 that does not have overflow and that is closest to the pixel for which outline data is generated, the outline buffers 106 of adjacent pixels are referenced one by one, and overflow value can be added to an outline buffer 106 that does not have overflow. The case of setting in the overflow buffer 106 for which there is no overflow and that is closest to the outline buffer 106 of the pixel for which outline data has been generated can be said to the least amount of drawing error.

Figure 10:
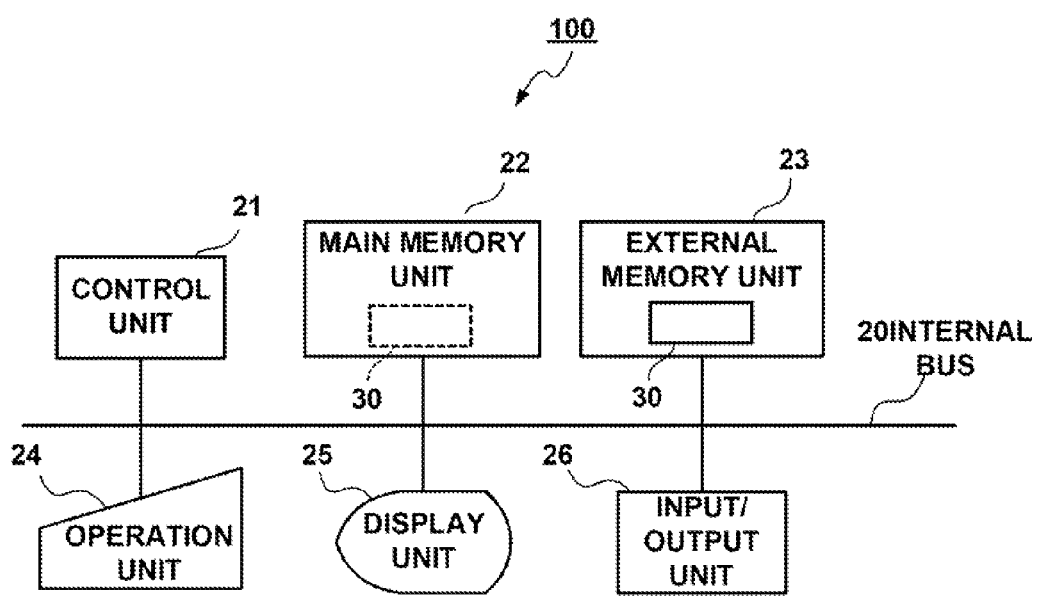
FIG. 10 is a block diagram illustrating an example of physical construction when the drawing device is mounted in a computer.

FIG. 10 is a block diagram illustrating an example of physical construction when the drawing device is mounted in a computer. The drawing device 100 of this embodiment can be achieved with hardware having the same construction as a typical computer. As explained using FIG. 2, the overflow correction circuit 1 forms part of the drawing device 100. The drawing device 100, as illustrated in FIG. 10, comprises a control unit 21, a main memory unit 22, an external memory unit 23, and operation unit 24, a display unit 25 and an input/output unit 26. The main memory unit 22, external memory unit 23, operation unit 24, display unit 25 and input/output unit 26 are each connected to the control unit 21 via an internal bus 20.

The control unit 21 comprises a CPU (Central Processing Unit), and executes processing for drawing that includes the overflow correction processing according to a program 30 that is stored in the external memory unit 23.

The main memory unit 22 comprises RAM (Random-Access Memory), in which the program 30 that is stored in the external memory unit 23 is loaded, and is used as a work area for the control unit 21. The outline buffer 106 above is included in the main memory unit 22.

The external memory unit 23 comprise non-volatile memory such as a flash memory, a hard disk, DVD-RAM (Digital Versatile Disc Random-Access Memory) and DVD-RW (Digital Versatile Disc ReWritable), and stores in advance the program 30 for causing the control unit 21 to perform the aforementioned processing, supplies the data stored by the program 30 to the control unit 21, and stores data supplied from the control unit 21.

The operation unit 24 comprises a keyboard, pointing device such as a mouse, and an interface device that connects the keyboard and pointing device to the internal bus 20. Instructions for creating, inputting, transmitting and receiving image data that includes Bezier curves, specifications of images to be displayed, the range and magnification rate of the drawing area and the position of the drawing area on the display are input and supplied to the control unit 21 via the operation unit 24.

The display unit 25 comprises a CRT (Cathode Ray Tube) or LCD (Liquid Crystal Display), and displays drawn images.

The input/output unit 26 comprises a wireless transceiver, a wireless modem or network terminal device, and a serial interface or LAN (Local Area Network) interface, etc. that connects these. Image data that includes Bezier curves can be received or transmitted via the input/output unit 26.

The drawing device 100 of the present invention, which includes the overflow correction circuit 1, can be constructed as an electronic circuit that is mounted with circuits comprising hardware parts such as an LSI (Large Scale Integration) in which circuits that can achieve the anti-aliasing process as described above are assembled. Moreover, by having the control unit 21 of the computer processing unit above execute the program for performing each of the functions above, it is possible to achieve the drawing device 100 through software. In that case, the CPU of the control unit 21 executes the processing of the overflow correction circuit 1 by loading the program 30 that is stored in the external memory unit 23 into the main memory unit 22 and executing the program 30, controlling the operation of each part and performing all of the functions above.

As explained above, the drawing device 100 of this embodiment has the following advantages.

The first advantage is that it is possible to prevent drawing error when overflow occurs.

The second advantage is that drawing is possible without drawing errors even when the number of bits per pixels in an outline buffer is reduced, and thus the capacity of the outline buffer can be reduced.

The third advantage is that drawing is possible without drawing errors even when the number of bits per pixels in an outline buffer is reduced, and thus it is possible to improve the efficiency of using the memory bus.

The following are also included as other preferred modifications of the present invention.

The vector image drawing device of a first aspect of the present invention preferably comprises the judgment unit that, when the setting unit adds to the numerical value of contour data of the adjacent pixel, recursively determines whether or not overflow occurs in the outline overflow of that pixel according to the added result; wherein the setting unit, when the judgment unit determines that the overflow occurs, adds the numerical value of the overflow portion in the contour data to the numerical value of the contour data of a pixel with no overflow that is on the same scan line as the pixel for which overflow was determined to occur and that is closest to that pixel, and sets the result.

Preferably, the contour generation unit comprises,
a drawing processing unit that
generates numerical values for data representing the start of fill-in and data representing the end of fill-in such that the signs differ from each other,
sequentially adds contour data stored in the outline buffer for each pixel along a scan line in the drawing area, and
generates drawing data for each pixel that indicates whether or not fill-in is performed.

The vector drawing method of another aspect of the present invention preferably comprises the judgment step that, when the setting unit adds to the numerical value of contour data of the adjacent pixel, recursively determines whether or not overflow occurs in the outline buffer of that pixel according to the added result; and wherein in the setting step, when the overflow is determined to occur in the judgment step, the numerical value of the overflow portion in the contour data is added to the numerical value of the contour data of a pixel with no overflow that is on the same scan line as the pixel for which overflow was determined and that is closest to that pixel, and the result is set.

Preferably, the contour generation step comprises,
a drawing processing step of
generating numerical values for data representing the start of fill-in and data representing the end of fill-in such that the signs differ from each other,
sequentially adding contour data stored in the outline buffer for each pixel along a scan line in the drawing area, and
generating drawing data for each pixel that indicates whether or not fill-in is performed.

Moreover, the hardware configuration and flowcharts are examples and can be arbitrarily changed or modified.

The portion that is the center for performing the processing of the drawing device 100, which comprises a control unit 21, a main memory unit 22, an external memory unit 23, an operation unit 24, and input/output unit 26 and internal bus 20, can be achieved using a normal computer system without the need of a special system. For example, it is possible to construct a drawing device 100 for executing the operation above, by storing a computer program for executing the operation above on a recording medium (flexible disk, CD-ROM, DVD-ROM) that is readable by a computer, then distributing that program and installing it on a computer. It is also possible to construct a drawing device 100 by storing that computer program in a memory device of a server on a communication network such as the Internet, and downloading that program by a normal computer system.

In the case where the function of the drawing device 100 is achieved by an operation shared by the OS (operating system) and an application program, or by the OS and application program working together, it is possible to store just the portion for the application program on a recording medium or memory device.

Moreover, it is also possible to place the computer program on a carrier wave and distribute the program via a communication network. For example, the computer program can be posted on a bulletin board (BBS, Bulletin Board System) of a communication network, and the computer program can be distributed via the network. Construction can also be such that it is possible to execute the above processing by starting the computer program, and under the control of the OS, to execute that computer program like other application programs.

The contents disclosed in Patent Literature 1 and Patent Literature 2 are also incorporation in this specification.

EXPLANATION OF REFERENCE NUMBERS

1 Overflow correction circuit
2 Error judgment unit
3 Pixel position transfer unit
21 Control unit
22 Main memory unit 23 External memory unit
24 Operation unit
25 Display unit
26 Input/output unit
30 Program
100 Drawing device
101 Control point input unit
102 Bezier curve division unit
103 Coordinate conversion unit
104 Contour generation circuit
105 Anti-alias circuit
106 Outline buffer
107 Mask generation unit
108 Fill-in unit
109 Combining unit
110 Dithering unit
111 Image buffer
112 Filter unit
113 Color conversion unit
120 Drawing processing unit
201, 301, 302, 401, 402 Outline data
202, 303, 403 Pixel data

The invention claimed is:

1. A vector image drawing device comprising:
a contour generation unit that, based on vector data, generates contour data that represents starting pixels on a scan line in a drawing area where fill-in starts, and ending pixels where fill-in ends;
an outline buffer that stores the number of starting or ending fill-in points of the contour data for each drawn pixel;
a judgment unit that, when storing the contour data in the outline buffer, determines in which pixel there is overflow in the outline buffer of contour data; and
a setting unit that adds the numerical value of the overflow portion of a pixel that the judgment unit determined to have overflow to the numerical value of contour data that corresponds to a pixel adjacent to the pixel in which overflow occurred,
wherein the contour generation unit comprises a drawing processing unit that:
generates numerical values for data representing the start of fill-in and data representing the end of fill-in such that the signs differ from each other,
sequentially adds contour data stored in the outline buffer for each pixel along a scan line in the drawing area, and
generates drawing data for each pixel that indicates whether or not fill-in is performed.

2. The vector image drawing device according to claim 1, comprising
the judgment unit that, when the setting unit adds to the numerical value of contour data of the adjacent pixel, recursively determines whether or not overflow occurs in the outline buffer of that pixel according to the added result; and wherein
the setting unit, when the judgment unit determines that the overflow occurs, adds the numerical value of the overflow portion in the contour data to the numerical value of the contour data of a pixel with no overflow that is on the same scan line as the pixel for which overflow was determined to occur and that is closest to that pixel, and sets the result.

3. A vector image drawing method comprising:
a contour generation step of, based on vector data, generating contour data that represents starting pixels on a scan line in a drawing area where fill-in starts, and ending pixels where fill-in ends;
a storage step of storing the number of starting or ending fill-in points of the contour data for each drawn pixel in an outline buffer;
a judgment step of, when storing the contour data in the outline buffer, determining in which pixel there is overflow in the outline buffer of contour data; and
a setting step of adding the numerical value of the overflow portion of a pixel that the judgment step determined to have overflow to the numerical value of contour data that corresponds to a pixel adjacent to the pixel in which overflow occurred,
wherein the contour generation step comprises a drawing processing step of
generating numerical values for data representing the start of fill-in and data representing the end of fill-in such that the signs differ from each other,
sequentially adding contour data stored in the outline buffer for each pixel along a scan line in the drawing area, and
generating drawing data for each pixel that indicates whether or not fill-in is performed.

4. The vector image drawing method according to claim 3, comprising
The judgment step that, when the setting step adds to the numerical value of contour data of the adjacent pixel, recursively determines whether or not overflow occurs in the outline buffer of that pixel according to the added result; and wherein
in the setting step, when the overflow is determined to occur in the judgment step, the numerical value of the overflow portion in the contour data is added to the numerical value of the contour data of a pixel with no overflow that is on the same scan line as the pixel for which overflow was determined and that is closest to that pixel, and the result is set.

5. A recording medium on which a program is recorded that causes a computer to execute:
a contour generation step of, based on vector data, generating contour data that represents starting pixels on a scan line in a drawing area where fill-in starts, and ending pixels where fill-in ends;
a storage step of storing the number of starting or ending fill-in points of the contour data for each drawn pixel in an outline buffer;
a judgment step of, when storing the contour data in the outline buffer, determining in which pixel there is overflow in the outline buffer of contour data of a pixel; and
a setting step of adding the numerical value of the overflow portion of a pixel that the judgment step determined to have overflow to the numerical value of contour data that corresponds to a pixel adjacent to the pixel in which overflow occurred,
wherein the contour generation step comprises a drawing processing step of
generating numerical values for data representing the start of fill-in and data representing the end of fill-in such that the signs differ from each other,
sequentially adding contour data stored in the outline buffer for each pixel along a scan line in the drawing area, and
generating drawing data for each pixel that indicates whether or not fill-in is performed.

* * * * *